United States Patent
Afzali-Ardakani et al.

(10) Patent No.: US 8,834,967 B2
(45) Date of Patent: Sep. 16, 2014

(54) METHOD OF FORMING GRAPHENE NANOMESH

(71) Applicant: International Business Machines Corporation, Armonk, NY (US)

(72) Inventors: Ali Afzali-Ardakani, Ossining, NY (US); Ahmed A. Maarouf, Mohegan Lake, NY (US); Glenn J. Martyna, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/966,442

(22) Filed: Aug. 14, 2013

(65) Prior Publication Data

US 2014/0203467 A1    Jul. 24, 2014

Related U.S. Application Data

(63) Continuation of application No. 13/745,170, filed on Jan. 18, 2013.

(51) Int. Cl.
*C01B 31/00* (2006.01)
*C01B 31/04* (2006.01)

(52) U.S. Cl.
CPC ......... *C01B 31/0484* (2013.01); *C01B 2204/20* (2013.01); *Y10S 977/734* (2013.01); *C01B 2204/00* (2013.01); *Y10S 977/70* (2013.01); *Y10S 977/767* (2013.01); *Y10S 977/887* (2013.01); *Y10S 977/888* (2013.01)
USPC ........... 427/230; 427/551; 427/553; 427/595; 977/700; 977/767; 977/887; 977/888; 977/734

(58) Field of Classification Search
CPC ............ C01B 31/0484; C01B 2204/00; C01B 2204/20; Y10S 977/734
USPC .......... 427/230–239, 551, 553, 595; 977/700, 977/767, 887, 888
See application file for complete search history.

(56) References Cited

U.S. PATENT DOCUMENTS 8,268,180 B2    9/2012   Arnold et al.
8,426,309 B2 *  4/2013   Ward et al. .................... 438/672
2010/0218801 A1  9/2010  Sung et al.
2013/0169142 A1 * 7/2013  Hyde et al. .................... 313/296
2013/0192460 A1 * 8/2013  Miller et al. ..................... 95/47

FOREIGN PATENT DOCUMENTS

WO    2008061224 A1    5/2008
WO    2009158117 A2    3/2010
WO    2011094597 A2    8/2011

OTHER PUBLICATIONS

Kim et al., "Fabrication and Characterization of Large-Area, Semi-conducting Nanoperforated Graphene Materials," Nano Lett., vol. 10, No. 4, 2010, pp. 1125-1131.*
MSDS "ACS Material Single Layer Graphene," retreived from http://www.acsmaterial.com/upload/1111/270102384.pdf on Oct. 1, 2013, 7 pages.*
Abou-Kandil et al, "Doped, Passivated Graphene Nanomesh, Method of Making the Doped, Passivated Graphene Nanomesh, and Semiconductor Device Including the Doped, Passivated Graphene Nanomesh", U.S. Appl. No. 13/194,976, filed Jul. 31, 2011, 30 pages.
Pedersen et al, "Graphene Antidot Lattices: Designated Defects and Spin Qubits", Phys. Rev. Lett., vol. 100, 2008, 136804, 4 pages.
Bai, et al, "Graphene Nanomesh", Nature Nanotechnology, vol. 5, 2010, pp. 190-194.
Martinazzo, et al, "Symmetry-Induced Band-Gap Opening in Graphene Superlattices", Physical Review B, vol. 81, No. 24, 245420, 8 pages.
Kim, et al, "Fabrication and Characterization of Large-Area, Semi-conducting Nanoperforated Graphene Materials", Nano Lett., vol. 10, No. 4, 2010, pp. 1125-1131.

* cited by examiner

*Primary Examiner* — William Phillip Fletcher, III
(74) *Attorney, Agent, or Firm* — Cantor Colburn LLP; Vazken Alexanian

(57) ABSTRACT

A method of reducing the diameter of pores formed in a graphene sheet includes forming at least one pore having a first diameter in the graphene sheet such that the at least one pore is surrounded by passivated edges of the graphene sheet. The method further includes chemically reacting the passivated edges with a chemical compound. The method further includes forming a molecular brush at the passivated edges in response to the chemical reaction to define a second diameter that is less than the initial diameter of the at least one pore.

5 Claims, 9 Drawing Sheets

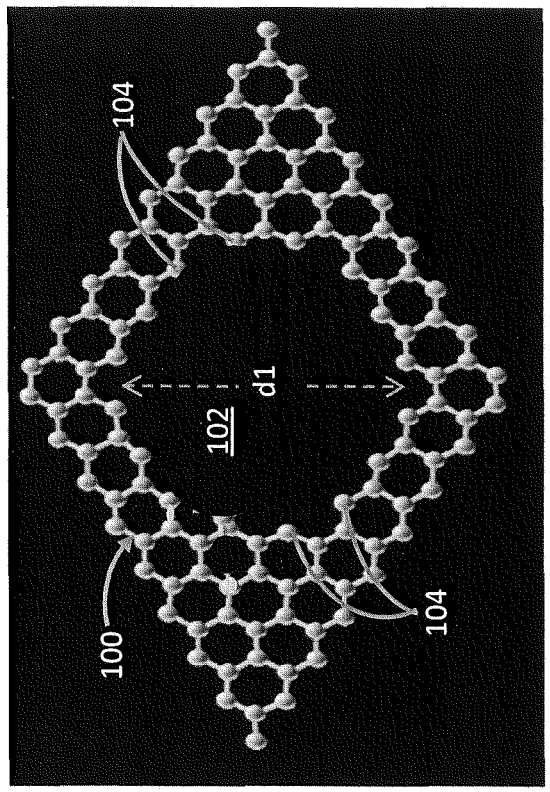
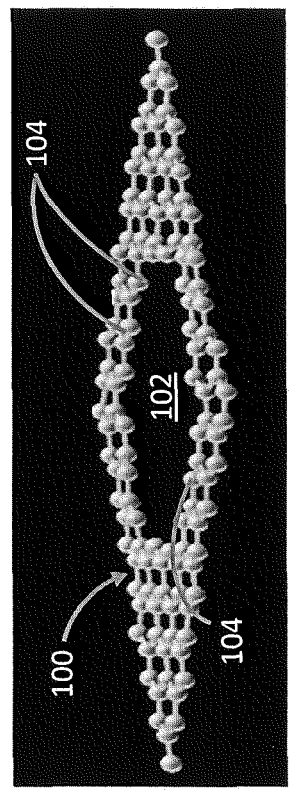
FIG. 1A
FIG. 1B

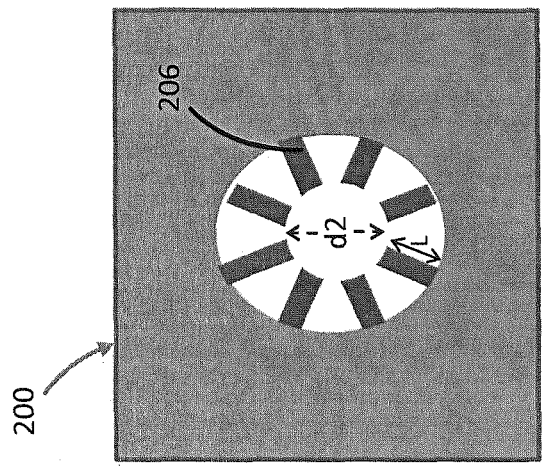
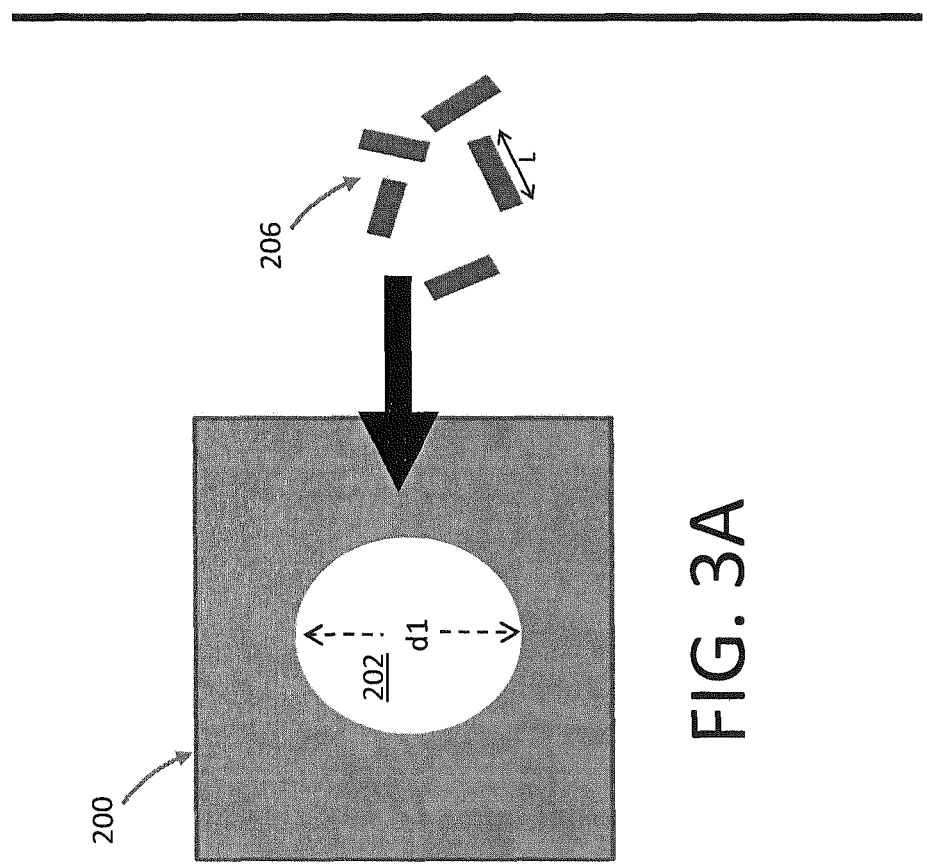
FIG. 3B
FIG. 3A

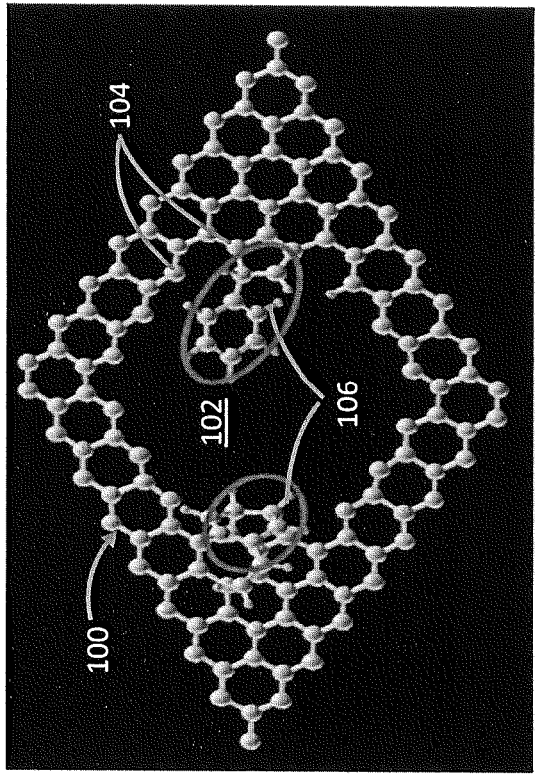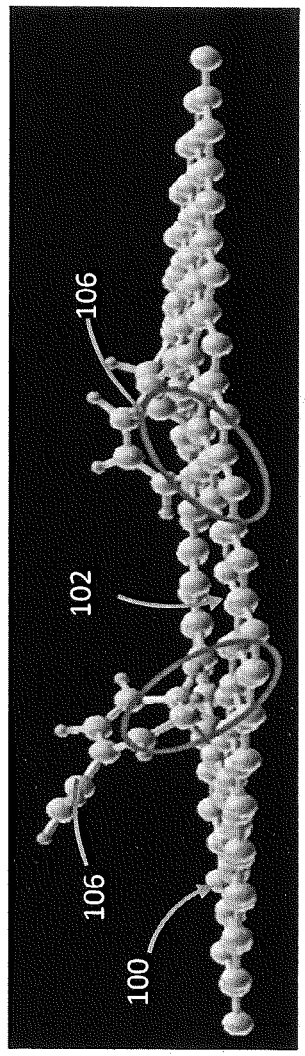
FIG. 5A
FIG. 5B

METHOD OF FORMING GRAPHENE NANOMESH

CROSS-REFERENCE TO RELATED APPLICATION

This application is a continuation of U.S. patent application Ser. No. 13/745,170, filed Jan. 18, 2013, the disclosure of which is incorporated by reference herein in its entirety.

BACKGROUND

The present invention relates generally to graphene nanomeshes, and more specifically, to forming pores in graphene nanomeshes.

Graphene nanomeshes have increased in interest due to their potential use in nanoelectronics, nanocatalysis, chemical and biological sensing, and other industrial disciplines and applications. One conventional method of forming pores is nanoimprint lithography. The resulting pores, however, are formed having a diameter of hundreds of nanometers (nm). Other conventional methods of forming pores such as block copolymer (BCP) lithography and e-beam etching provide pores having a diameter of about 10 nm. Consequently, the conventional methods of fabricating nanomeshes are limited from providing pores having sub-nanometer diameters. As a result, the overall potential use of graphene nanomeshes is limited.

SUMMARY

According to one embodiment, a graphene nanomesh includes a graphene sheet having a plurality of pores formed therethrough. Each pore has a first diameter defined by an inner edge of the graphene sheet. A plurality of passivation elements are bonded to the inner edge of each pore. The plurality of passivation elements defines a second diameter that is less than the first diameter to decrease an overall diameter of at least one pore among the plurality of pores.

According to another embodiment, a method of forming pores in a graphene sheet comprises locating a graphene sheet in vacuum containing a plurality of passivation elements. The method further includes forming at least one pore having a first diameter in the graphene sheet via an e-beam. The e-beam induces a plurality of active carbon sites at edges of the nanopore. The method further includes exposing the carbon sites to the plurality of passivation elements for a predetermined period of time such that the passivation elements bond to the active carbon sites and extend into the at least one pore to decrease the initial diameter.

In still another embodiment, a method of reducing the diameter of pores formed in a graphene sheet comprises forming at least one pore having a first diameter in the graphene sheet such that the at least one pore is surrounded by passivated edges of the graphene sheet. The method further includes chemically reacting the passivated edges with a chemical compound. The method further includes forming a molecular brush at the passivated edges in response to the chemical reaction to define a second diameter that is less than the initial diameter of the at least one pore.

Additional features are realized through the various embodiments and claims. Other embodiments and features are described in detail herein and are considered a part of the claimed invention. For a better understanding of the invention the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features are apparent from the following detailed description taken in conjunction with the accompanying drawings in which:

FIG. 1A is a top view of a graphene sheet following an e-beam etching process to form an initial nanopore surrounded by active carbon sites;

FIG. 1B is a perspective view of the graphene sheet illustrated in FIG. 1;

FIG. 3A is a schematic of a graphene sheet including a nanopore having passivated edges;

FIG. 3B illustrates the graphene sheet of FIG. 3A following a chemical reaction that bonds passivation elements to the passivated edges of the nanopore;

FIG. 5A illustrates the graphene sheet of FIG. 4A showing the styrene molecules bonded to the active carbon sites to reduce the initial diameter of the nanopore;

FIG. 5B is a perspective view of the graphene sheet illustrated in FIG. 5A

DETAILED DESCRIPTION

Figure 2A:
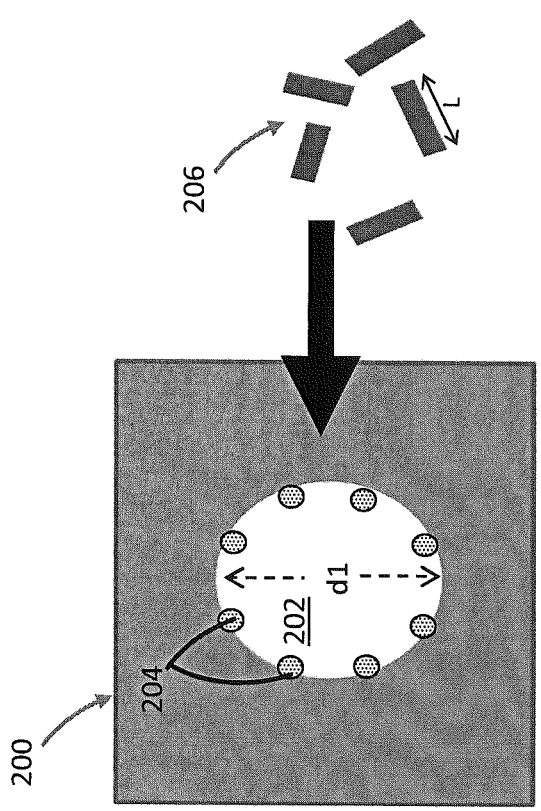
FIG. 2A is a schematic of a graphene sheet located in a vacuum environment containing passivation elements following an e-beam etching process to form a nanopore.

With reference now to FIGS. 1A and 1B, a graphene sheet 100 having a nanopore 102 formed therethrough is illustrated according to an exemplary embodiment. One or more nanopores 102 may be formed in the graphene sheet 100 using, for example, an electron beam (e-beam) etching process. It is appreciated, however, that a variety of techniques for forming the nanopores may be utilized including, but not limited to, nanoprint lithography, block copolymer (BCP) lithography, and di-block copolymer lithography may form one or more nanopores in the graphene sheet as discussed in greater detail below. In at least one embodiment, the graphene sheet 100 may be formed with a plurality of nanopores 102 at a predetermined hole-hole separation pattern to form a graphene nanomesh. The graphene sheet 100 comprises hexagonal lattice (e.g., a honeycomb) of carbon atoms. The graphene sheet 100 may comprise a single layer of carbon atoms, or multiple single layers stacked against one another.

The nanopores 102 may be formed in a variety of shapes including, but not limited to, circular, elliptical, diamond, and square. The nanopores 102 are formed to have a predetermined initial diameter (d1). The initial diameter (d1) may range, for example, from about 1 nanometer (nm) to about 30 nm. In the case where a nanopore 102 is formed using an e-beam etching process, active carbon atoms are induced, thereby creating active carbon sites 104 at the inner edge of the graphene sheet 100 surrounding the nanopore 102 as further illustrated in FIGS. 1A and 1B. The active carbon sites 104 may be passivated by bonding a passivation element 106 to the active sites 104, i.e., bonding the passivation elements to the active carbon atoms.

The bonding between the active carbon atoms and the passivation elements creates one or more functional groups. The functional groups may include, but are not limited to, a carboxyl group and an amine. Accordingly, the functional groups may functionalize the nanopores 102 to perform various applications including, but not limited to, protein detection, DNA detection, gas detection, ion chelation, nanoelectronics and nanocatalysis. The functional groups may also functionalize nanopore by reducing the initial diameter of the nanopore, as discussed in greater detail below.

Referring to FIG. 2A, a graphene sheet 200 is illustrated following an e-beam etching process to form a nanopore 202. The e-beam etching process induces active carbon sites 204 containing one or more active carbon atoms as discussed in detail above. The graphene sheet is located in a vacuum environment containing one or more passivation elements 206. That is, the graphene sheet is placed in a vacuum containing a plurality of passivation elements having a predetermined length (L). Although the exemplary embodiment illustrated in FIG. 2 shows the passivation elements having the same length (L), a plurality of passivation elements having different lengths may be used. The passivation elements may be organic molecules that form functional groups, such as a carboxyl group or an amine, in response to chemically bonding to the active carbon sites. The organic molecules may include, for example, alkenes. Since the active carbon atoms are highly active, the passivation elements migrate toward the active carbon sites to be chemically bonded thereto and results in passivation of the nanopore edges.

Figure 2B:
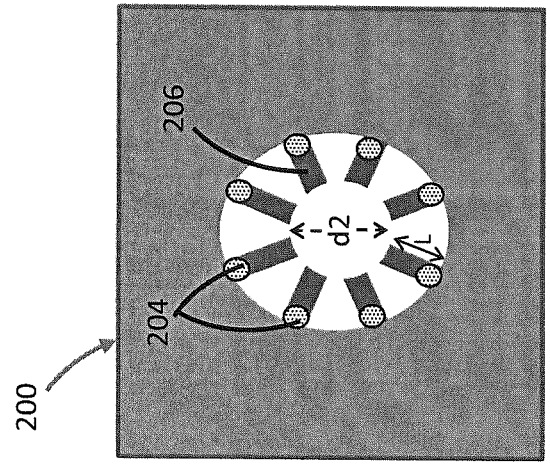
FIG. 2B illustrates the graphene sheet of FIG. 2A following bonding of the passivation elements to active carbons sites existing at the edge of the nanopore.

Referring now to FIG. 2B, the passivation elements having a predetermined length are shown to be chemically bonded to the active carbon sites to form respective functional groups. The functional groups, i.e., the active carbon atoms bonded to the passivation elements, extend from the inner edge of the graphene sheet into the nanopore 202, thereby defining a molecular brush 208 having a second diameter (d2) that is smaller than the initial diameter (d1). Accordingly, the overall diameter of the nanopore 202 may be reduced based on a selected length (L) of the passivation elements. For example, the initial diameter of the nanopore 202 illustrated in FIG. 2A may be about 5 nm. Passivation elements having a length (L) of about 3 nm may be bonded to the active carbon sites. The passivation elements form a brushing that extends from the inner edge of the graphene sheet into the nanopore 202 to define a new diameter of about 2 nm. By bonding passivation elements having varying lengths, the overall diameter of the nanopore 202 may be controlled, while maintaining a high periodicity of nanopores in the graphene sheet 200.

Passivation of the nanopore edges by bonding passivation elements to the active carbon sites 204, i.e., active carbon atoms, also provides the capability of selecting a particular ending to carry out a particular application. For example, if there is a need to detect the presence hydrogen molecules, a graphene sheet 200 may be introduced into a vacuum containing oxygen atoms and one or more nanopores 202 may be formed in the graphene sheet 200 using an e-beam etching process. The resulting active carbon atoms 204 created at the edge of the graphene sheet 200 surrounding the nanopore 202 attract the surrounding oxygen atoms. The oxygen atoms covalently bond to the active carbon atoms 204 to form a carboxylate functional group ($RCOO^-$) that is negatively charged. Hydrogen gas ions may be positively charged, and therefore may attach to the negatively charged carboxylate functional group formed at the inner edge of the nanopore. Accordingly, the graphene nanopores 202 may be utilized to detect hydrogen gas. It can be appreciated that the graphene sheet 200 may be applied to other applications, such as DNA detection, by selectively creating particular functional groups that are responsive to a desired molecule that is to be detected, filtered, etc.

In another embodiment illustrated in FIGS. 3A-3B, one or more nanopores 202 are formed in a graphene sheet 200 using a di-block copolymer lithography process, for example, as opposed to an e-beam etching process. The difference in this case, however, is that edges of the nanopore 202 are passivated. Accordingly, no active carbon sites are created at the inner edge of the graphene sheet surrounding the nanopore 202 as further illustrated in FIG. 3A. That is, since the di-block copolymer lithography process is used, the nanopore 202 is already passivated such that active carbon atoms are not formed. The nanopores 202, therefore, are chemically functionalized by chemically reacting the passivated inner edge of the nanopore 202 with passivation elements 206, e.g., molecules, to reduce the initial diameter of the nanopore 202. In at least one embodiment, the passivated inner edge may be reacted, for example, with various analytes (e.g., chemical compounds) including, but not limited to, benzene, toluene, ethyl benzene, n-propyl benzene, n-butyl benzene, p-xylene, phenol, 4-methylphenol, phenetole, 3,5-xylenol, and anisole. Accordingly, a brushing comprising the plurality passivation elements 206 may be formed at the passivated inner edge of the nanopore 202 as illustrated in FIG. 3B. Accordingly, the initial diameter of the nanopore 202 is reduced as discussed above.

Figure 4A:
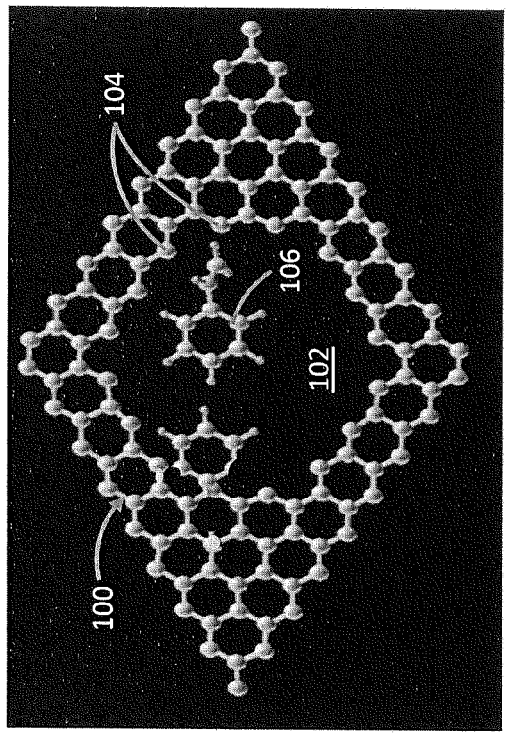
FIG. 4A illustrates the graphene sheet of FIG. 1A showing styrene molecules migrating toward the nanopore.
Figure 4B:
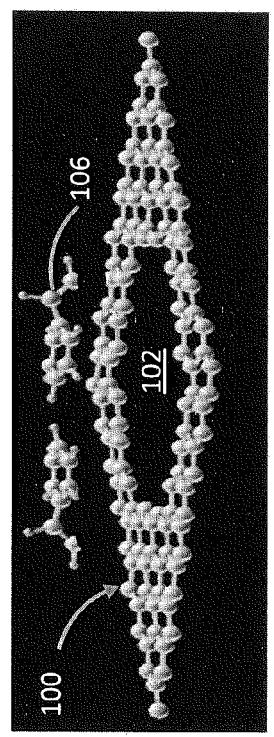
FIG. 4B is a perspective view of the graphene sheet illustrated in FIG. 4A.

Turning now to FIGS. 4A-4B, the graphene sheet 100 is illustrated following an e-beam etching process to form a nanopore 102. The edge of the graphene sheet 100 surrounding the nanopore 102 includes active carbon atoms 104 (as best seen the top view of FIG. 4A). At an initial time (t=0) the nanopore 102 is introduced to a vacuum environment containing styrene molecules 106. The styrene molecules 106 become attracted to the active carbon atoms 104. After about 1 picosecond (t=1 ps), styrene molecules 106 begin bonding to the active carbon atoms 104 to functionalize the edges of the nanopore 102 as illustrated in FIGS. 5A-5B. That is, the styrene molecules 106 lose hydrogen atoms to a respective active carbon atoms 104 located at the inner edge of the graphene sheet 100 surrounding the nanopore 102. As time continues, the styrene molecules 106 continue to covalently bond with the active carbon atoms 104, thereby decreasing the overall diameter of the nanopore 102. That is, the desired diameter of the nanopore 102 may be conveniently controlled based on the amount of time the graphene sheet 100 is exposed to the styrene molecules 106.

Figures 6A, 6B:
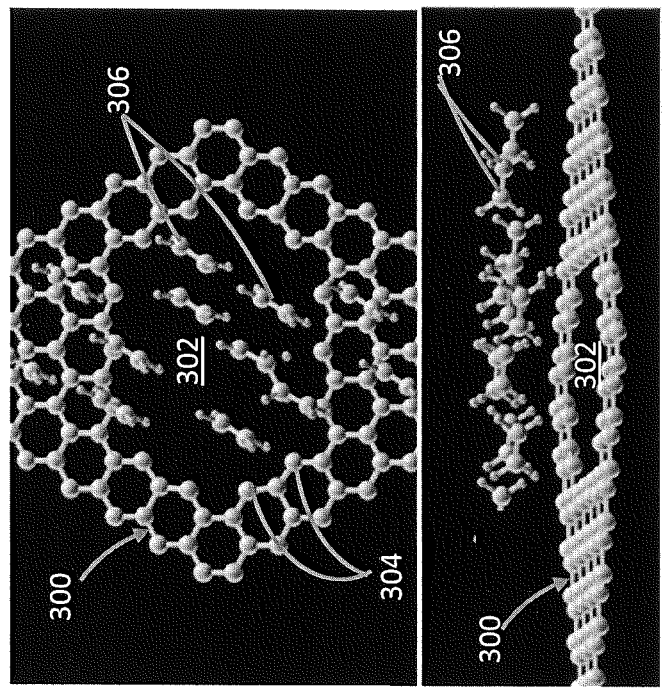
FIG. 6A is a top view of a graphene sheet having an initial nanopore formed therethrough via an e-beam etching process and located in a vacuum environment containing ethylene molecules according to another embodiment.
FIG. 6B is a perspective view of the graphene sheet illustrated in FIG. 6A.
Figure 7A:
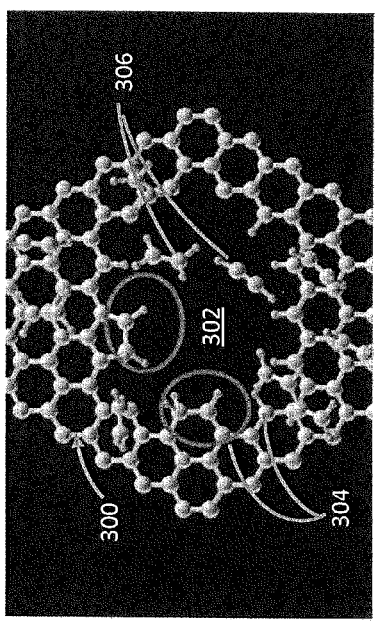
FIG. 7A illustrates the graphene sheet of FIG. 6A showing the ethylene molecules bonded to active carbon sites surrounding the nanopore to reduce the overall diameter of the initial nanopore.
Figure 7B:
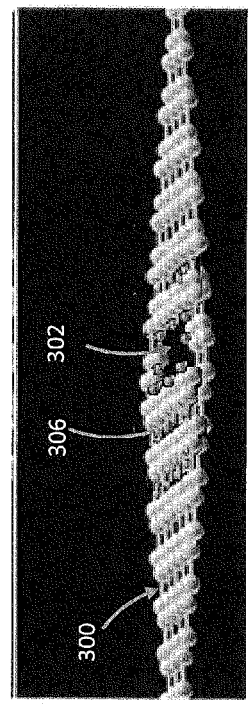
FIG. 7B is a perspective view of the graphene sheet illustrated in FIG. 7A.

Turning now to FIGS. 6A-6B, a graphene sheet 300 is illustrated following an e-beam etching process to form a nanopore 302. The edges of the graphene sheet 300 include active carbon atoms 304 that surround the nanopore 302 (as best seen in the top view of FIG. 6A). At an initial time (t=0) the nanopore 302 is introduced to a vacuum environment containing ethylene molecules 306. The ethylene molecules 306 become attracted to the active carbon atoms 304. After about 1 picosecond (t=1 ps), the ethylene 306 breaks down at the edge of the nanopore 302 and covalently bonds to the active carbon atoms 304 as illustrated in FIGS. 7A-7B. Accordingly, the initial diameter of the nanopore 302 is reduced.

Figure 8:
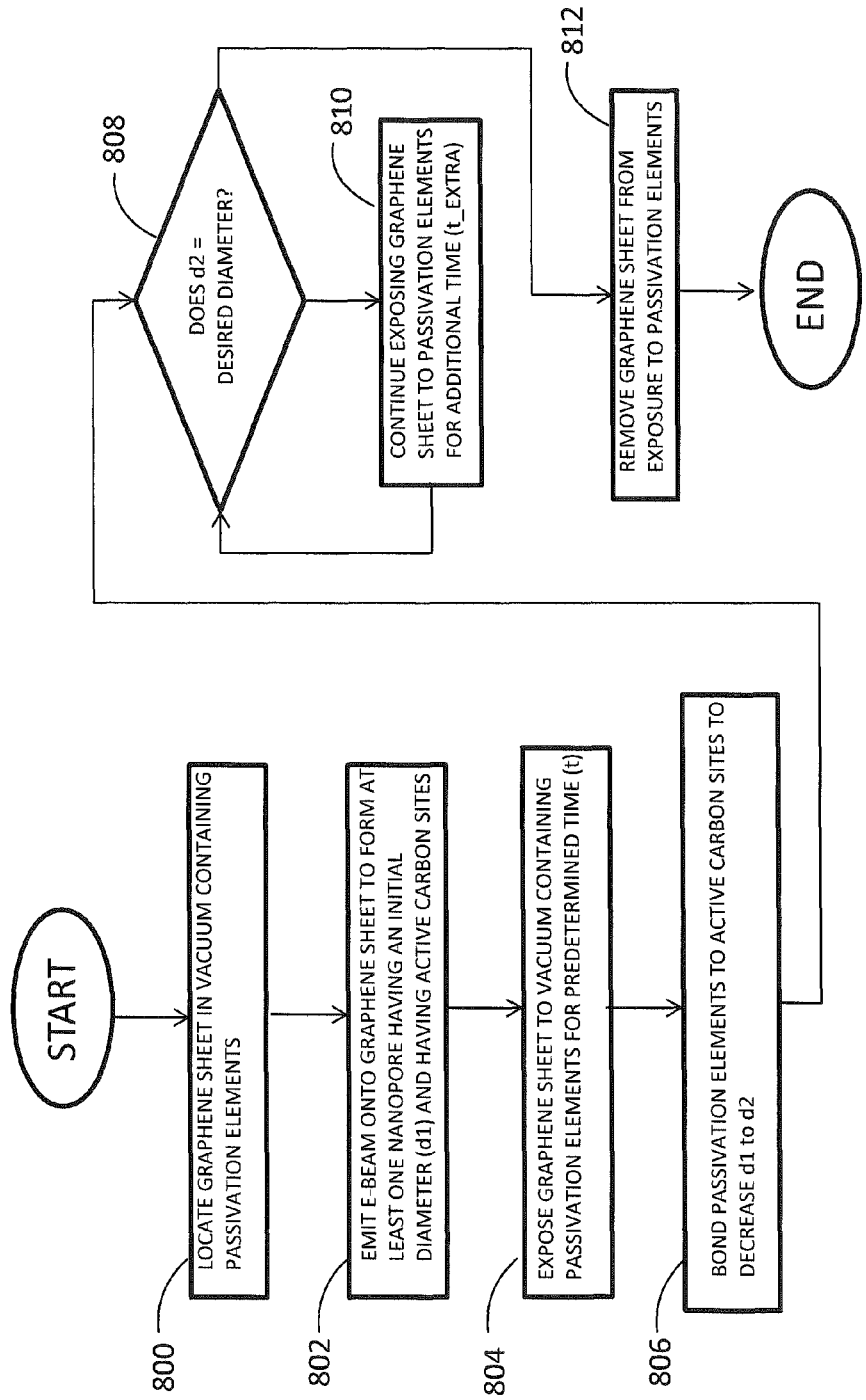
FIG. 8 is a flow diagram illustrating a method of forming nanopores in a graphene sheet according to an exemplary embodiment.

Referring now to FIG. 8, a flow diagram illustrates a method of forming nanopores in a graphene sheet according to an exemplary embodiment. At operation 800, a graphene sheet is located in a vacuum containing a plurality of passivation elements. The type and the length of the passivation elements may be selected according to a desired application of a user. At operation 802, an electric beam (e-beam) impinges ions onto the surface of the graphene sheet to form one or more nanopores. The nanopores are formed to have an initial diameter (d1). The e-beam also induces active carbon sites at the edge of the nanopore. The active carbon sites include active carbon atoms that are highly susceptible to bonding with the surrounding passivation elements contained in the vacuum. At operation 804, the graphene sheet and the nanopore are exposed to the passivation elements for a predetermined time (t). As time increases from an initial time (t0) to a second time (t2), the passivation elements bond to the active carbon atoms, thereby decreasing the initial diameter (d1) to a smaller diameter (d2) at operation 806. At operation 808, a determination is made as to whether d2 exists at a desired diameter. If d2 is at a desired diameter, the graphene sheet is removed from exposure to the passivation elements at operation 812, and the method ends. For example, the graphene sheet is removed from the vacuum.

However, if d2 has not reached a desired diameter, the graphene sheet may be maintained in the vacuum for an additional amount of time (t_EXTRA) allowing for continued exposure to the passivation elements at operation 810. The continued exposure allows the passivation elements to continue bonding to the active carbon atoms such that the diameter of the nanopore may continue to decrease. After t_EXTRA expires, a determination as to whether d2 has reached the desired diameter is again performed at operation 808. If d2 has not reached a desired diameter, the graphene sheet may again be maintained in the vacuum for an additional amount of time (t_EXTRA) allowing for continued exposure to the passivation elements at operation 810. Otherwise, the graphene sheet is removed from exposure to the passivation elements at operation 812, and the method ends.

Figure 9:
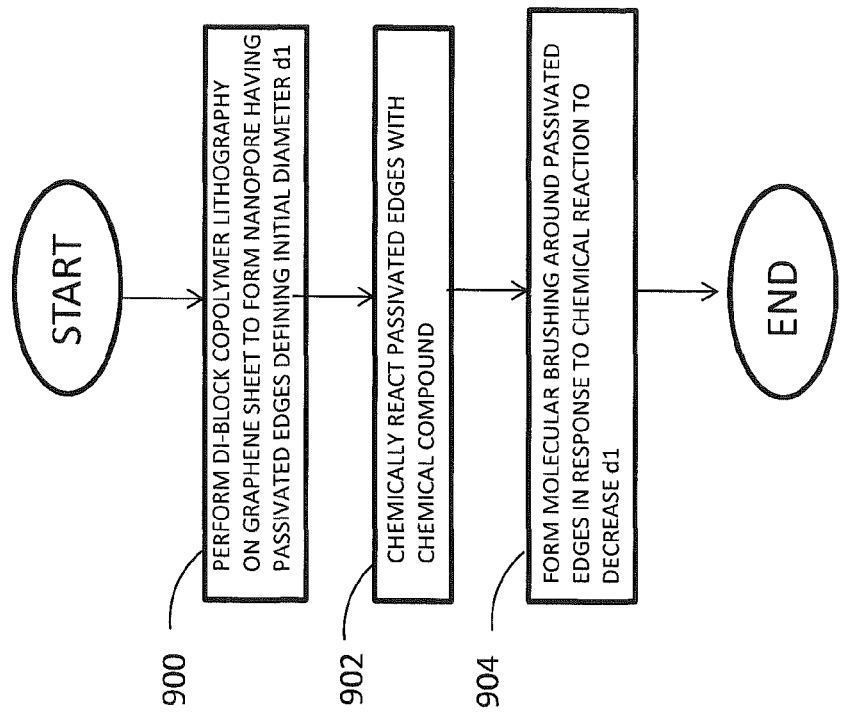
FIG. 9 is a flow diagram illustrating a method of forming nanopores in a graphene sheet according to another exemplary embodiment.

Turning now to FIG. 9, a flow diagram illustrates a method of forming nanopores in a graphene sheet according to another exemplary embodiment. At operation 900, a di-block copolymer lithography process is applied to a graphene sheet to form one or more nanopores having a passivated edge that defines an initial diameter (d1). Although a di-block copolymer lithography process is described in FIG. 9, another nanopore forming process such as, for example, a nanoimprint lithography process may be used. At operation 902, the passivated edges are chemically reacted with a chemical compound. The chemical compound may include, for example, benzene, toluene, ethyl benzene, n-propyl benzene, n-butyl benzene, p-xylene, phenol, 4-methylphenol, phenetole, 3,5-xylenol, and anisole. At operation 904, a molecular brush is formed at the inner edge of the nanopore in response to the chemical reaction, and the method ends. The molecular brush comprises a plurality of molecular elements extending from the edge of the graphene sheet into the initially formed nanopore, thereby decreasing d1.

As discussed in detail above, at least one embodiment provides a graphene nanomesh having one or more nanopores that include passivation elements to reduce the overall diameter of the nanopore. Accordingly, diameters of the nanopores may be controlled without eliminating current techniques used to form nanopores in graphene sheets. Further, nanopores having sub-nanometer diameters may be conveniently formed based on the length of the selected passivation elements that bond to the active carbon sites or on the length of the chemical compounds that bond to the passivated edges of the pores.

In addition, at least one embodiment provides a graphene nanomesh that may be applied to a wide variety of application by conveniently forming a wide variety of functional groups at the edge of the nanopores to detect various gases and/or proteins. The chemical bonding between the active carbon sites and the passivation elements also increases the functionalization of the graphene nanomesh.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the operations described therein without departing from the scope of the claims. For instance, the operations may be performed in a differing order. The operations may also be added, deleted or modified. All of these variations are considered a part of the inventive concept.

While various embodiments have been described, it will be understood that those skilled in the art, both now and in the future, may make various modifications which fall within the scope of the following claims. These claims should be construed to maintain the proper protection for the claims described herein.

What is claimed is:

1. A method of forming pores in a graphene sheet, the method comprising:
   locating a graphene sheet in vacuum containing a plurality of passivation elements;
   forming at least one pore having a first diameter in the graphene sheet via an e-beam, the e-beam inducing a plurality of active carbon sites at edges of each nanopore, such that the passivation elements bond to the active carbons sites; and
   exposing the carbon sites to the plurality of passivation elements for a predetermined period of time such that the passivation elements bond to the active carbon sites to form covalent bonds between the passivation elements and the active carbon sites and extend into the at least one pore to decrease the initial diameter,
   wherein the passivation elements are selected from a group comprising styrene and ethylene.

2. The method of claim 1, further comprising forming a second diameter to be less than 1 nanometer.

3. A method of reducing the diameter of pores formed in a graphene sheet, the method comprising:

forming at least one pore having a first diameter in the graphene sheet such that the at least one pore is surrounded by passivated edges of the graphene sheet;

chemically reacting the passivated edges with a chemical compound, wherein the chemical compound comprises an organic compound selected from the group comprising benzene, toluene, ethyl benzene, n-propyl benzene, n-butyl benzene, p-xylene, phenol, 4-methylphenol, phenetole, 3,5-xylenol, and anisole; and forming a molecular brush at the passivated edges in response to the chemical reaction to define a second diameter that is less than the initial diameter of the at least one pore.

4. The method of claim 3, wherein the forming at least one pore further comprises forming the at least one pore via nanoprint lithography.

5. The method of claim 3, wherein the forming at least one pore further comprises forming the at least one pore via di-block copolymer lithography.

* * * * *